Patented Sept. 11, 1934

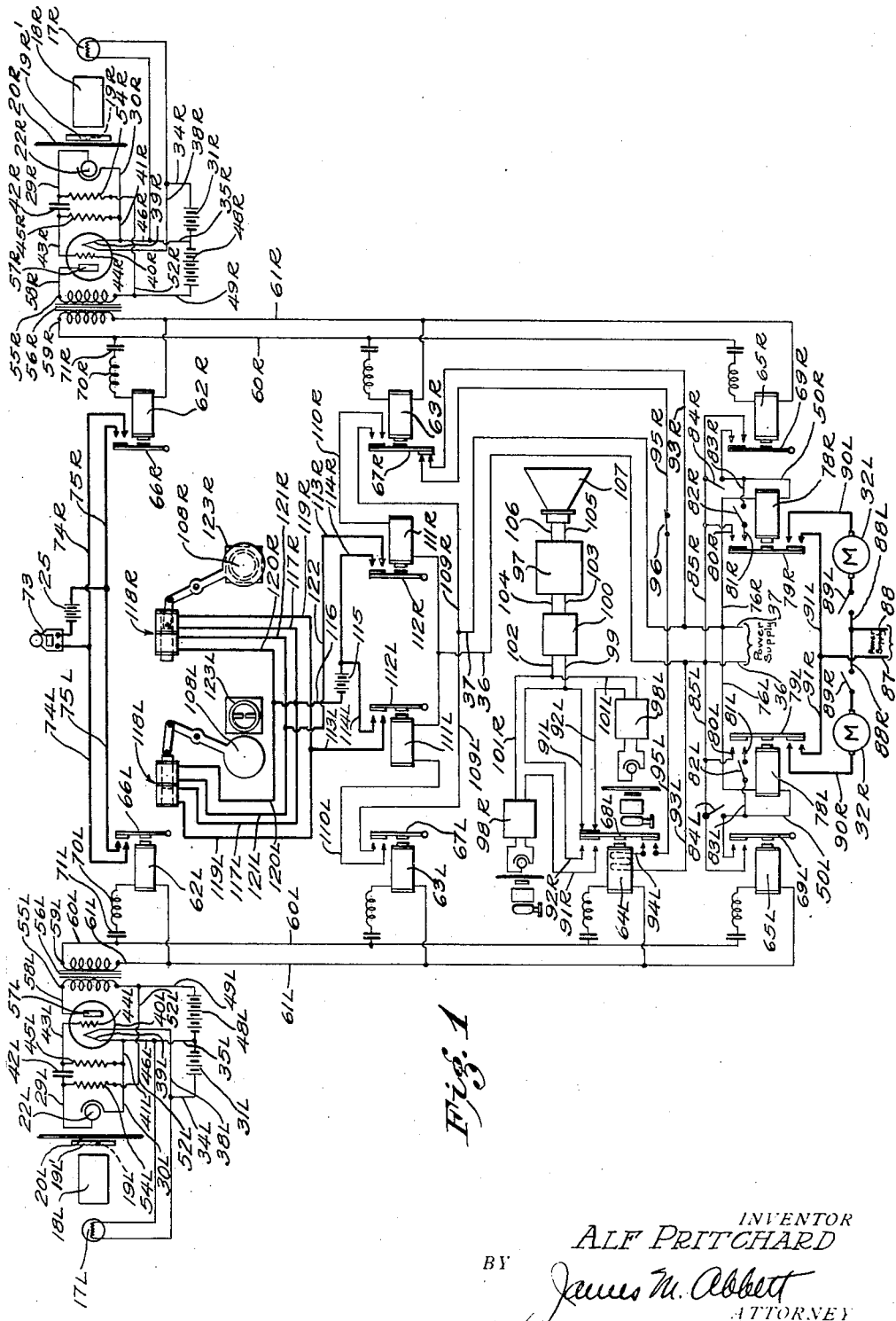

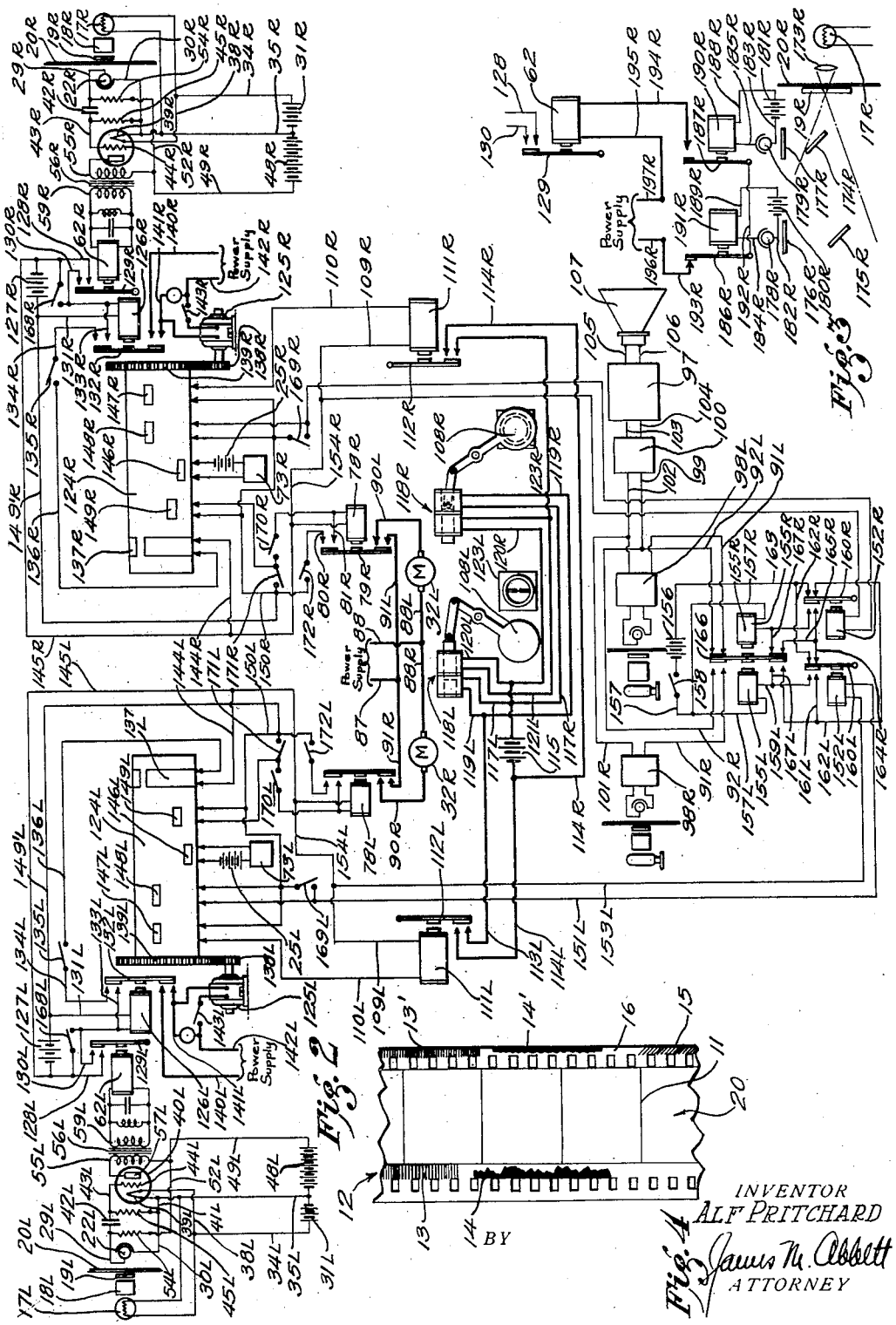

1,972,904

UNITED STATES PATENT OFFICE 1,972,904

METHOD AND MEANS FOR MAKING AUTOMATIC "CHANGE OVER" IN MOVING PICTURE APPARATUS

Alf Pritchard, Coronado, Calif.

Application October 28, 1932, Serial No. 640,101

10 Claims. (Cl. 88—17)

This invention relates to a method and means of making an automatic "change over" in moving picture apparatus, and particularly pertains to means for automatically starting a second projecting machine at the conclusion of the operation of the first projecting machine.

In the operation of projecting machines where multireel films are shown it is necessary to use two moving picture projecting machines, one of which will be normally inoperative and must be set in operation at approximately the same moment that an operating machine reaches the end of the reel which it is showing, in order that the moving picture will have continuity and so that the action will not be interrupted when changing to consecutive reels of film. This operation of "changing over" from one projecting machine to the other has been in most cases brought about manually and with the necessity for the continued attention of the operator. Various expedients have been provided in an attempt to produce this "change over" automatically, such structures having included mechanical metering means or trip mechanism, and in some instances the use of obstructions or contact members on the film whereby mechanical or electrical means have been set in operation. Heretofore most of these devices have proven unsatisfactory due to the fact that they require the use of objectionable additional equipment and for the further reason that they have not been accurate in their performance. It is the principal object of the present invention therefore to provide means for automatically producing a "change over" from one projecting machine to another in a positive and precise manner without the use of mechanical equipment and the attendant care and adjustment which must be given this equipment in an attempt to cause it to function properly.

The present invention contemplates the provision of means embodied in a moving picture projecting machine, and which means is dependent upon a beam of light passing through a moving picture film and being acted upon by the film in a manner to initiate an automatic "change over" without requiring the presence of any mechanical trip means acted upon by the film or carried thereby.

The invention is illustrated by way of example in the accompanying drawings in which:

Figure 1 is a view in diagram indicating in a general manner the application of the present invention to a moving picture projecting machine in which sound film is projected and which involves the use of a series of relay circuits to actuate different units of a motion picture projecting and operating mechanism.

Fig. 2 is a view in diagram showing the "change over" apparatus as used in connection with mechanical means for making electrical contact in the circuits of projecting machine operating units.

Fig. 3 is a view in plan showing a form of the present invention in which color features are embodied to be acted upon by light beams.

Fig. 4 is a view in plan showing a fragmentary length of motion picture film and indicating the various manners in which the film may be prepared for use in the various forms of the apparatus shown in the preceding figures.

Referring more particularly to Fig. 4 of the drawings, 20 indicates a length of motion picture film having the usual picture frame sections 11 along one side of which is a sound track 12 by which sound is photographically recorded. This sound track is usually of the form indicated at 13 or the form indicated at 14. It is, however, to be understood that these two forms of sound track are shown on the same film for sake of convenience in illustration only. In the first mentioned form of sound track the sound lines extend entirely across the track and vary in density and width, while in the form of sound track indicated at 14 the sound track is rendered opaque along one of its sides, the opposite side having a serrated edge. At 15 in Fig. 4 an area is indicated on the opposite side of the film from the sound track which is of a selected color and for a purpose to be hereinafter set forth. The color area may be used on a film with certain apparatus, or the areas 13' or 14' may be used. It will be understood that when any one of these areas is used on the edge of the film opposite the sound track 12 the other areas are not used. This opposite edge of the film from the sound track will hereinafter be designated as the frequency strip 16, and it is with this particular area of the film that the present invention is concerned in a manner to control the present device.

Referring more particularly to the left side of Fig. 1 of the drawings, 17L indicates the usual exciting lamp for a slit lens 18L. (In view of the fact that the invention is shown in diagram in Figs. 1 and 2, and for the further reason that most of the parts are in duplicate, the same reference numerals will be used throughout with identical or duplicate parts, but with the additional use of the letters R and L to indicate parts of right and left hand machines). This lens projects a beam of light through the sound track area 16 of the film 20 as directed through an aperture 19L in an aperture plate 19L'. The beam of light from the slit lens 18L then passes to a photo electric cell 22L.

It is contemplated in the present invention to utilize the beam of light from the exciting lamp 17L to initiate and control the operation of a second projecting machine through variation in the light value of the beam caused by the fact that the beam will encounter a frequency area 13' or 14' along the frequency strip 16 of the film and that this frequency area will be so positioned with relation to the length of the strip as to initiate the operation and control circuits for a second projecting machine, or other circuits to be controlled and by which various pieces of apparatus might be operated, as will be hereinafter described. It may be desirable to apply a color area to the frequency strip as indicated at 15 as a substitute for the frequency areas 13' or 14', and by which the same results of "change over" are obtained, as will be hereinafter explained. An apparatus for this purpose is shown in Fig. 3 of the drawings and will be hereinafter described.

The beam of light from the exciting lamp 17L and the slit lens 18L will pass through the aperture 19L to the photoelectric cell 22L. This cell will be impressed with a light impulse of the frequency represented by the frequency strip 13' or 14', as recorded on the prepared film. Connected with the photoelectric cell are conductors 29L and 30L carrying current impulses finally to a resonant circuit which is resonant at the frequency recorded on the film. This circuit derives its power from a source of low voltage supply indicated at 31L and which is connected to wires 34L and 35L respectively. A conductor 38L leads to the positive side of filament 39L of a vacuum tube generally indicated at 40L. The negative wire from this filament as indicated at 41L connects with the wires 30L from the photoelectric cell 22L. The wire 29L which leads from the other pole of the photoelectric cell connects with a condenser 42L and the condenser in turn is connected by a conductor 43L with the grid 44L of the vacuum tube 40L. A resistance 45L is connected across the line from the conductor 30L to conductor 43L. The conductor 30L also connects with wire 41L and a return lead wire 46L which connects with conductor 35L. A second source of electrical energy is indicated at 48L. The negative pole of this source of energy connects with conductor 35L. The positive pole of this source of energy connects with conductor 49L which is secured to a conductor 52L connected with the resistance 54L which is attached to the wire 29L upon the opposite side of the condenser 42L from the point of attachment of the resistance 45L. The conductor 52L also connects with the primary winding 55L of a transformer 56L. The opposite side of this winding is connected to the plate 57L of the vacuum tube 40L by means of a conductor 58L. A secondary winding 59L of the transformer connects with conductors 60L and 61L which lead to the winding of a magnet 62L. In the drawings similar conductors lead to magnets 63L, 64L, and 65L which close switch members 66L, 67L, 68L, and 69L, respectively, for a purpose and in the manner to be hereinafter set forth. The circuits of magnets 62L, 63L, 64L, and 65L are provided with series resonance arrangements including an inductance coil 70L and the condensor 71L in series with the magnet winding. The capacity of the condenser in each instance and the electrical values of a condenser 71L and an inductance coil 70L plus the inductance of the magnet are such as to neutralize each other when excited by a current of certain or desired frequency. It is of course well known that with a given adjustment of capacity and inductance or a given relation between them, their reactance will balance out for one certain frequency, and current at this frequency will then flow through the circuit in maximum volume although currents at any other frequency still will be opposed by the reactances. In this case the established different capacitance and inductance values of the several magnet circuits will cause these circuits to become resonant at different frequencies as separately controlled by the current flowing through the circuit caused by the variation of light impulses impressed upon the photoelectric cell.

In the form of the invention shown in Fig. 1 of the drawings, it is intended that when a desired frequency is impressed upon the resonant circuit it will selectively actuate the correspondingly relay magnets 62L, 63L, 64L, and 65L. It will therefore be evident from the foregoing that by varying the values of the inductance and the capacitance in the resonant circuits of the separate relay magnets, it is possible to cause the magnets to operate at different intervals and at different points of time with relation to each operation. As here shown, the relay magnet 62L is intended to close a circuit to a bell or other signal 73 having a source of electric energy 25. The relay 65L controls the projector motor circuit as will be hereinafter described and relay 63L controls the picture "change over" apparatus while relay 64L controls the sound "change over" apparatus. The switch blade 66L of the relay 62L establishes communication between conductors 74L and 75L and the source of supply 25, thus establishing electrical connection with the bell 73. The switch blade 69L closes the circuit from a source of electric supply, through lead wires 36 and 37 and through the conductor 76L to one side of the magnet 78L of an interlocking relay switch which simultaneously operates a contact member 79L establishing a circuit through conductor 80L to conductor 81L and thence through switch 82L by which the projection machine motor 32R may be normally stopped if desired. The circuit then continues through conductor 83L to a switch 84L by which the projection machine may be normally started if desired. This circuit is then completed to the return lead wire 85L to the feed wire 36. The contact member 79L of the relay 78L also completes the circuit through the motor 32R of a moving picture projection machine. This motor receives its current supply from main lead wires 87 and 88 which may be controlled by a make and break switch 89R interposed in the line 88R and through which the circuit may pass to motor 32R and thence along wire 90R to the contact member 79L, from which the circuit continues along conductor 91 to feed line 87. The relay 65L when engaged closes a circuit from feed wire 36 through wire 85L to the switch blade 69L and then through conductor 50L to magnet 78L after which the circuit continues along conductor 76L to feed wire 37.

The relay 64L will act to close its switch 68L to establish a circuit from conductors 91R and 92R which is connected in the sound system. A secondary winding in the relay coil is energized by an interlocking circuit and maintains the circuit through conductors 91L and 92L closed after the relay 64L has been initially energized and until relay 63R is energized. This will take place when the right hand machine has approached the conclusion of its run of film.

This secondary winding is connected with feed wire 36 by a wire 93L. The circuit then continues through wire 94L to the switch blade 68L and then along conductor 95L to manually operated switch 96. A wire 95R then contacts with switch blade 67R of relay 63R. Due to the arrangement here shown the relays 63R serves the dual purposes performed on the other side by relay 63L and 64L. This circuit is then completed through conductor 93R to feed wire 37.

In tracing the circuits through the sound equipment it will be understood that the major circuits are shown only and not the many secondary or power input circuits with which said apparatus may be concerned.

In another form of the invention diagrammatically indicated in Fig. 2 of the drawings, single relays 62L or 62R are provided and various circuits are made mechanically by drums 124L and 124R which are driven by motors 125L and 125R and carry a plurality of contacts. In this description the left hand machine will be described with the understanding that the parts are duplicated in the right hand machine.

When the magnet 64L is initially energized with an appropriate resonant current switch blade 68L will be drawn to make contact between conductors 91R and 92R, and will at the same time break a circuit through conductor 91L and 92L. The circuit through conductors 91L and 92L includes left projecting machine to the main amplifier 97 which amplifier is common to both machines. This circuit is as follows: From amplifier 98L of the left hand projecting machine the sound currents pass through switch blade 68L to conductor 91L and thence along conductor 99 to a fader 100. The other side of the fader connects with amplifier 98L by a wire 101L and 102. The sound apparatus initiating and controlling the production of sound currents for both projecting machines are indicated in diagram only and since their details are of no concern here the parts will not be given reference numerals. A wire 102 completes the circuit through the fader from the conductor 101L. Wire 103 and 104 connect the fader with the amplifier 97. Wire 105 and 106 connect the amplifier 97 with a loud speaking telephone 107. When the switch blade 68L moves to contact with conductors 91R and 92R a sound circuit is completed to the main amplifier 97 from the amplifier 98R of the right hand projecting machine and the sound circuit for the left hand machine is broken. The relays 63L and 63R alternately control dowser blades 108L and 108R. The control circuit for the left hand dowser is as follows: Current flows from lead wire 37 to wires 109R and 109L. The circuit continues through switch blade 67L to conductor 110L which connects with the winding of a relay 111L by which a switch blade 112L is drawn into engagement with conductors 113L and 114L when the relay 111L is energized. The conductor 114L leads to one side of a source of electric energy 115. The other side of this source of energy is provided with a conductor 116. This wire connects with wires 117L and 117R. 117L leads to one winding of the solenoid 118L. The circuit then continues along wire 119L to wire 113L. The conductor 116 also leads to wire 120L and 120R. Wire 120L leads to another winding on solenoid 118L after which the circuit continues along wire 121L to wire 122 which connects with wire 113R. The dowser discs act in conjunction with the lamp houses 123L and 123R.

In operation of the form of the invention shown in Fig. 1 of the drawings it will be understood that the film which is being used in dual motion picture projection machines has been specially prepared in accordance with one of the methods indicated in Fig. 4 as represented by the frequency fields 13'–14'. These fields will occur near the concluding end of the picture portion of the film, and are so designed as to create a light variation in the beams of light emanating from the source 17L or 17R to set up a state of resonance in the circuits of relays 62, 63, 64 and 65, either right or left, in which the resonance frequency of the circuits will correspond to the light variation frequency of the beam of light as controlled by the field 13' or 14' on the film. It will, of course, be understood that the resonance frequency of the several relay circuits may be selectively determined and may be varied with relation to each other in a manner to insure that the various relays may operate simultaneously or in any desired sequence. In a preferred manner of operation the relay 62L is actuated first and this in turn produces a warning signal such as ringing bell 73. The relay 65L is then energized to start the motor of the right hand projecting machine. When this operation is initiated the motor of the left hand machine is still running, and consequently the film in the left hand machine is still showing. Likewise the dowser plate 108R of the right hand machine is in a shielding position over its lamp house. A resonant circuit is then set up for dowser relay 63L which causes one winding of the solenoid 118L to swing dowser plate 108L to an obstructing position and one winding of 118R to swing dowser plate 108R to a non-obstructing position. Simultaneously with this action relay 64L is energized with a suitable resonant frequency current to break the sound circuit to the left hand projecting machine and establishing the circuit to the right hand projecting machine. This magnet 64L also establishes an interlocking circuit through wire 93L and 95L through switch blade 67R of relay 63R. The complete change over has thus been made.

In a reverse change from the right hand machine to the left hand machine, the operation is identical except that the relay 63R serves the dual purposes of relays 63L and 64L and restores the original sound current through the left hand machine while breaking the sound circuit of the right hand machines. In Fig. 2 the interlocking relay 126L is energized from an electrical source, such as indicated at 127L. A wire 128L leads from the source to switch blade 129L after which the current passes through magnet 126L along wire 130L. The current is then completed to the source 127L along wire 131L. This will cause the interlocking relay 126L to be energized and act upon switch blade 132L. The blade 132L closes a circuit from the electric source 127L along wire 133L which connects with wire 130L and then through wire 134L to a normally closed switch 135L. The switch connects with wire 136L leading to a contact brush which will engage a commutator segment 137L on drum 124L.

The drum 124L is driven by the motor 125L through gears 138L and 139L. The motor circuit is controlled by the interlocking relay 126L substantially with the circuit previously described. This takes place when switch blade 132L contacts a wire 140L leading from a suitable power source and a wire 141L leading to motor 125L. A return lead wire 142L connects the source of current with the motor 125L through switch 143L. A tell-tale light may be connected across the motor circuit. The drum segment 137L completes a circuit from wire 136L to wire 144L which connects with a feed wire 145L of the electric source 127L. This circuit sustains the interlocking relay 126L after the relay 62L has become deenergized. The circumferential length of drum segment 137L is such as to maintain this circuit until the routine of all of the other contact circuits have functioned, and the drum has substantially completed a revolution of its operation.

It is to be understood that the functions of right and left hand relays 62, 63, 64 and 65, shown in Fig. 1 are performed in the structure of Fig. 2 by right and left hand drum segments 146, 147, 148 and 149. In the structure of Fig. 1 the sequence of power of the relays was controlled by the creation of suitable resonant circuits determined by the arrangement of light frequency fields along the edge of the film. In the structure of Fig. 2, however, the arrangement of the various electrical contact and conductor segments around the circumference of the drums will have this same effect and control. In the two forms of the invention as shown in Figs. 1 and 2 the signal circuit, the dowser circuits, and the motor circuits are identical so that the same reference characters are universally used in those circuits on both figures of the drawings.

The sound circuits which have been described in Fig. 1 as being controlled by relays 64L and 64R are controlled in Fig. 2 by the contact segments 148L and 148R in a slightly different manner as will now be described. The circuit obtains its electrical supply from source 127L after which the current travels along wire 149L' and 150L to make contact with segment 148L on the drum 124L. The circuit is then completed along wire 151L to wire 154L which connects with wire 145L of the source 127L. This circuit energizes magnet 152L and simultaneously interrupts a sound relay circuit of the left hand machine and completes a sound relay circuit of the right hand machine. The left hand sound relay circuits include magnet 155L, and the opposite circuit includes magnet 155R. The circuit through magnet 155L leads from electrical source 156 through wire 157L. A normally closed switch 158 interrupts this circuit if desired. The wire 157L leads to magnet 155L. The other side of the magnet carries a wire 159L which may contact with switch blade 160L of relay 152L. The relays 152R and 152L momentarily operate. This momentary action of relay 152L establishes a circuit to wire 161L connected with wire 162 L which leads to switch blade 160R of relay 152R. Contact is here made with wire 162R from which the circuit to the source 156 is completed along wire 163.

Prior to the energization of magnet 152L the switch blade 160L establishes electrical contact from wire 162R to wire 164R, connected with wire 165R leading to a position where it may contact with interlocking switch blade 166. A wire 167R connects with magnet 155R and thence along wire 157R and wire 157 to the source 156. When however, the circuit is established through magnet 152L the circuit through magnet 155R will be broken, since magnet 155L will be energized. This is brought about through contact of blade 160L with conductor 161L and 159L by which a circuit through the magnet 155L is established. This will swing switch blade 166 toward magnet 155L and complete two circuits. One circuit includes wire 162L which contacts with switch blade 166 and continues along wires 167L and 159L to magnet 155L. The other circuit includes wire 91R connecting with switch blade 166 and continuing along wire 92R to the wire 99 connected with the fader 100. This operation completes the sound circuit and also the interlocking relay circuit therefor.

Various switches are shown in the drawings and while they may not be necessary in an apparatus embodying the invention, their presence provides all the necessary controls for an operative pair of projecting machines. A normally opened switch 168L may be used to optionally start motor 125L. A normally opened switch 169L controls the sound relay mechanism independently of the drum. A switch 170L is normally closed and may be used when the last reel is being run and it is not desired to make a change over to the other machine but when it is desirable to control the other circuits, this switch may be opened.

The switch 171L is normally opened and is used to manually control the projector motor.

The switch 172L is normally closed and is used to break the interlocking circuit to relay 78L after the film being projected has completely run through the machine.

Referring more particularly to Fig. 3 of the drawings, a device is shown which will effect a beam of light passing from a source and through the film and light filters to photoelectric cells by which a circuit is controlled. The beam of light will be effected by a color area, such as that indicated at 15 of Fig. 4, and which is used instead of frequency strips 13' and 14'. Relay magnet 62 is connected to a feed wire 197R by a wire 195R. The circuit then continues along conductor 194R to a normally open switch blade 187R. The circuit then continues along conductor 192R to a normally closed switch blade 186R and then along wire 193R to a feed wire 196R.

Relay magnet 190R is connected to a source of electric energy 181R by a wire 188R. The circuit then continues along wire 185R to a photoelectric cell 179R. The opposite side of this photoelectric cell is connected to the source of electric energy 181R by a wire 183R.

Relay magnet 191R is connected to a source of electric energy 180R by a wire 189R. The circuit then continues along wire 184R to a photoelectric cell 178R, the opposite side of the cell is connected to the source of electric energy 180R by a wire 182R.

In the form of the invention shown in Fig. 3 of the drawings the operation is predicated upon the application of a streak of transparent color dye represented by field 15. This streak of color dye when the light beam from the exciting lamp 17R is projected upon it by a lens 173R will cause a colored beam of light to pass through an aperture 19R and fall upon reflectors 174R and 175R. These reflectors each bend and project a beam of light upon light filters 176R and 177R. Light filter 176R is such that it will absorb a color which is passed by light filter 177R. Light filter 177R is such that it will absorb a color which is passed by light filter 176R. When a white light is shown through the film, as normally would be the case, both filters will pass light which will fall upon their respective photoelectric cells. Thus causing both photoelectric cells to pass current to energize relay magnets 190R and 191R. Relay magnet 190R upon becoming energized draws switch blade 187R over to close the circuit with wire 194R, simultaneously, relay 191R upon becoming energized draws switch blade 186R over to open the circuit from wire 193R. When the portion of the film upon which the beam of light is projected is opaque, neither cell will receive light, therefore will not pass current to energize relay magnets 190R and 191R, thereby causing the circuit to relay magnet 62 to be broken by switch blade 187R. When however a colored light, of a color which will be caused by the streak of color dye 15 on the frequency strip 16 falls upon the color filters, filter 177R only will pass this light thereby causing a current to flow through the photoelectric cell 179R which causes relay magnet 190R to become energized causing switch blade 187R to be pulled over thereby closing the circuit from switch blade 187R to wire 194R completing the circuit from feed wire 196R to the magnet of relay 62.

It will be understood that relay 62, switch blade 129 and wires 128 and 130 correspond to relay 62R, switch blade 129R and wires 128R and 130R. And that when the apparatus as shown in Fig. 3 is used to control relay 62 the apparatus used to control relay 62R in Fig. 1 is not used.

It will thus be seen that the arrangement here disclosed makes it possible for two pieces of apparatus, such for example as two motion picture projecting machines, to be automatically operated in sequence as controlled by means upon the film for varying the light value or color value of a light beam passing through the film, and being projected through an area of a predetermined frequence of color.

While I have shown the preferred form of my invention as now known to me, it will be understood that various changes may be made in the combination, construction, and arrangement of parts by those skilled in the art without departing from the spirit of the invention as claimed.

Having thus described my invention, what I claim and desire to secure by Letters Patent is:

1. In combination with a pair of motion picture projecting machines, electric circuits including driving means for said machines, means for establishing said circuit, films adapted to pass through said machines, an exciting lamp for one of the machines by which a beam of light may be projected through the film, an area on said film adapted to vary the value of said beam of light when it is projected therethrough, and means sensitive to said variations whereby the electric operating circuit of the other motion picture machine may be established when the beam of light projects through the aforesaid area on the film, said light beam having a light variation frequency equal to the resonance frequency of a circuit to be established.

2. In an apparatus of the class described, the combination of a pair of motion picture projecting machines adapted to be operated in sequence, electric operating circuits for each of said machines, a motion picture film adapted to be run through the first of said machines, an area disposed upon said film adjacent the concluding end of its run and by which the light value will be varied in a predetermined manner as a beam of light is projected therethrough, an exciting lamp adapted to project a beam of light through said film and the area thereon, a resonant circuit including a photoelectric cell and upon which cell said beam of light strikes the resonance frequency of said circuit being equal to the light variation frequency of the beam of light, and means controlling the operating circuits of said second motion picture machine and set in motion by the establishment of the aforesaid resonant circuit when the beam of light has a frequency equal to the resonance frequency of said resonant circuit whereby to control the operative circuits of the projecting machines.

3. An apparatus of the class described, comprising a motion picture projecting machine, mechanical means for closing an electric circuit, a motor for driving said mechanical means, a circuit controlling said motor, a relay switch for establishing said circuit, a resonant circuit including said relay switch and means whereby a predetermined change in the value of a light beam passing through the film of the projecting machine to agree in light variation frequency with the resonance frequency of said resonant circuit will produce a circuit to energize said relay and close the circuit of said mechanical means.

4. An apparatus of the class described, comprising a motion picture projecting machine, mechanical means for closing an electric circuit, a motor for driving said mechanical means, a circuit controlling said motor, a relay switch for establishing said circuit, a resonant circuit including said relay switch and means whereby a predetermined change in the value of a light beam passing through the film of the projecting machine to agree in light variation frequency with the resonance frequency of said resonant circuit will produce a circuit to energize said relay and close the circuit of said mechanical means, a plurality of separate operating circuits and means whereby said mechanical means will close said plurality of circuits in succession and in synchronism one with the other.

5. In a motion picture projecting apparatus, an exciting lamp, a lens for projecting it through a motion picture film, means on said film for changing the light value of the beam of light passing through the film to a predetermined light variation frequency, a photoelectric cell upon which said light beam falls, a resonant electric circuit including said photoelectric cell and whereby the circuit will be established when the light variation frequency of the beam of light equals the resonance frequency of the resonant circuit and said beam of light falls upon the photoelectric cell, and a relay switch in said circuit adapted to be closed when the aforesaid resonant circuit is established.

6. In a motion picture projecting apparatus, an exciting lamp, a lens for projecting it through a motion picture film, means on said film for changing the light value of the beam of light passing through the film to a predetermined light variation frequency, a photoelectric cell upon which said light beam falls, a resonant electric circuit including said photoelectric cell and whereby the circuit will be established when the light variation frequency of the beam of light equals the resonance frequency of the resonant circuit and said beam of light falls upon the photoelectric cell, and a relay switch in said circuit adapted to be closed when the aforesaid resonant circuit is established, the means upon the film for producing the light variation frequency of said light beam being a frequency strip as used in sound photography.

7. In a motion picture projecting apparatus, an exciting lamp, a lens for projecting it through a motion picture film, means on said film for changing the light value of the beam of light passing through the film to a predetermined light variation frequency, a photoelectric cell upon which said light beam falls, a resonant electric circuit including said photoelectric cell and whereby the circuit will be established when the light variation frequency of the beam of light equals the resonance frequency of the resonant circuit and said beam of light falls upon the photoelectric cell, and a relay switch in said circuit adapted to be closed when the aforesaid resonant circuit is established, the means upon the film being a color area by which a predetermined light value may be obtained.

8. An apparatus of the class described comprising an exciting lamp, a slit lens through which a beam from said lamp is projected, a motion picture film adapted to move along the path of travel traversing said beam, a color area on said motion picture film and by which the light variation frequency of said beam is predeterminately changed in a photoelectric cell sensitive to said light beam, a color filter interposed between said photoelectric cell and the beam of light whereby all other color values than that of the area upon the film will be filtered out, a resonant electric circuit including said photoelectric cell and a relay switch said circuit having a resonance frequency equal to the light variation frequency of the beam of light passing through the color field, whereby the resonant circuit will be established when a beam of light of a predetermined color is impressed upon the photoelectric cell.

9. A method of controlling a resonant circuit which consists in passing a light beam through a moving film on which film a field occurs through which said beam of light passes and by which its light variation frequency is established at predetermined value, then causing said beam of light to fall upon a photoelectric cell included within a resonant circuit, which circuit has a resonance frequency equal to the light variation frequency passing through the field on the film whereby a desired operation will be set up by the resonant circuit.

10. In an electrical apparatus, a plurality of separate resonant circuits, electrical devices included in the several resonant circuits and adapted to be energized thereby, a transparent film having fields thereon adapted to change the light variation frequency of a beam of light passing therethrough, and light sensitive means upon which said beam of light falls after passing through said film and whereby said resonant circuits may be established when the light variation frequency of the beam of light equals the resonance frequency of one of said circuits.

ALF PRITCHARD.